United States Patent [19]
Gellert

[11] Patent Number: 5,387,099
[45] Date of Patent: Feb. 7, 1995

[54] INJECTION MOLDING VALVE MEMBER SEALING BUSHING WITH A THIN COLLAR PORTION

[76] Inventor: Jobst U. Gellert, 7A Prince Street, Georgetown, Ontario, Canada, L7G 2X1

[21] Appl. No.: 206,712

[22] Filed: Mar. 7, 1994

[30] Foreign Application Priority Data

Feb. 14, 1994 [CA] Canada .................................. 2115613

[51] Int. Cl.⁶ .............................................. B29C 45/23
[52] U.S. Cl. .................................... 425/564; 425/566
[58] Field of Search ............... 425/562, 563, 564, 565, 425/566

[56] References Cited
U.S. PATENT DOCUMENTS

| | | |
|---|---|---|
| 4,433,969 | 2/1984 | Gellert . |
| 4,521,179 | 6/1985 | Gellert . |
| 4,740,151 | 4/1988 | Schmidt et al. ...................... 425/562 |
| 4,919,606 | 4/1990 | Gellert . |
| 5,254,305 | 10/1993 | Fernandez et al. .................. 425/564 |

Primary Examiner—Tim Heitbrink
Attorney, Agent, or Firm—Dalesman & Company

[57] ABSTRACT

Valve gated injection molding apparatus wherein the reciprocating valve member extends into the melt passage through a sealing bushing. The sealing bushing has a thin steel collar portion which extends forwardly into the melt passage and fits around the valve member to form a seal against leakage of melt rearwardly along the valve member. In the preferred embodiments, the collar portion is thin enough that it is slightly compressed around the valve member by the pressure of the surrounding melt in the melt passage to improve the seal.

5 Claims, 3 Drawing Sheets

INJECTION MOLDING VALVE MEMBER SEALING BUSHING WITH A THIN COLLAR PORTION

BACKGROUND OF THE INVENTION

This invention relates generally to injection molding and more particularly to valve gated apparatus having a valve member sealing bushing with a thin collar portion which forms a seal against melt leakage.

Valve gated injection molding systems having a valve member sealing bushing are well known. In fact, the applicant's U.S. Pat. No. 4,433,969 which issued Feb. 28, 1984 shows a sealing bushing with a collar portion which extends rearwardly into the manifold to lengthen the sealing contact between the valve member and the sealing bushing. However, in this previous configuration the bushing is located between the manifold and the nozzle which has the disadvantage that additional mold height is required. The applicant's U.S. Pat. No. 4,521,179 which issued Jun. 4, 1985 has the bushing seated in the nozzle which has the disadvantage of being more costly to manufacture. U.S. Pat. No. 4,740,151 to Schmidt et al. which issued Apr. 26, 1988 shows a sealing and retaining bushing which extends rearwardly from the manifold to lengthen the sealing contact. With the demand for more and more compact molds, it is very desirable that the sealing contact between the sealing bushing and the valve member be as long as possible while the height Of the mold is as short as possible. Furthermore, none of these previous arrangements are able to utilize the pressure of the melt to improve the seal of the sealing bushing around the reciprocating valve member.

SUMMARY OF THE INVENTION

Accordingly, it is an object of the present invention to at least partially overcome the disadvantages of the prior art by providing valve gated injection molding apparatus wherein the valve member extends through an improved sealing bushing to seal against leakage of melt along the reciprocating valve member.

To this end, in one of its aspects, the invention provides valve gated injection molding apparatus having at least one heated nozzle seated in a mold, the heated nozzle having a rear end and a central bore extending therethrough in alignment with a gate in the mold leading to a cavity, a melt passage extending through a manifold and the central bore in the heated nozzle to convey melt to the gate, an elongated valve member having a front end and a rear end extending through the central bore of the nozzle, the rear end of the valve member being driven to reciprocate the valve member between a retracted open position and a forward closed position in which the front end of the valve member is seated in the gate, and a valve member sealing bushing being mounted rearwardly of the heated nozzle and having a valve member bore extending therethrough in alignment with the central bore of the nozzle whereby the elongated valve member extends through the valve member bore in the sealing bushing into the melt passage in alignment with the gate, having the improvement wherein the valve member sealing bushing has a thin collar portion which extends a predetermined distance forwardly into the melt passage and fits around the valve member to form a seal against substantial leakage of melt rearwardly along the reciprocating valve member.

Further objects and advantages of the invention will appear from the following description taken together with the accompanying drawings.

DETAILED DESCRIPTION OF THE INVENTION

Figure 1:
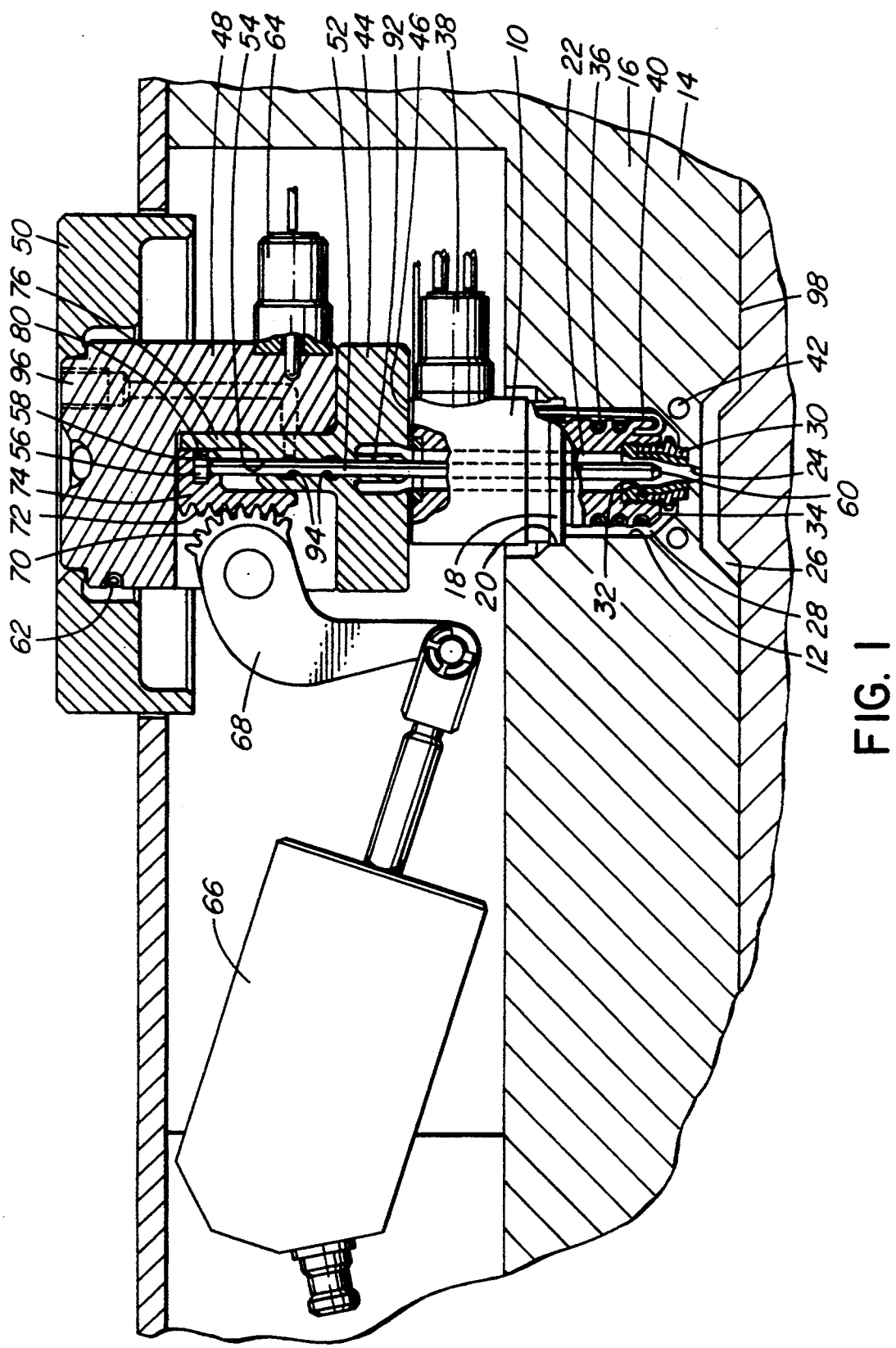
FIG. 1 is a partial sectional view of a portion of a single-cavity injection molding system or apparatus according to one embodiment of the invention.
Figure 2:
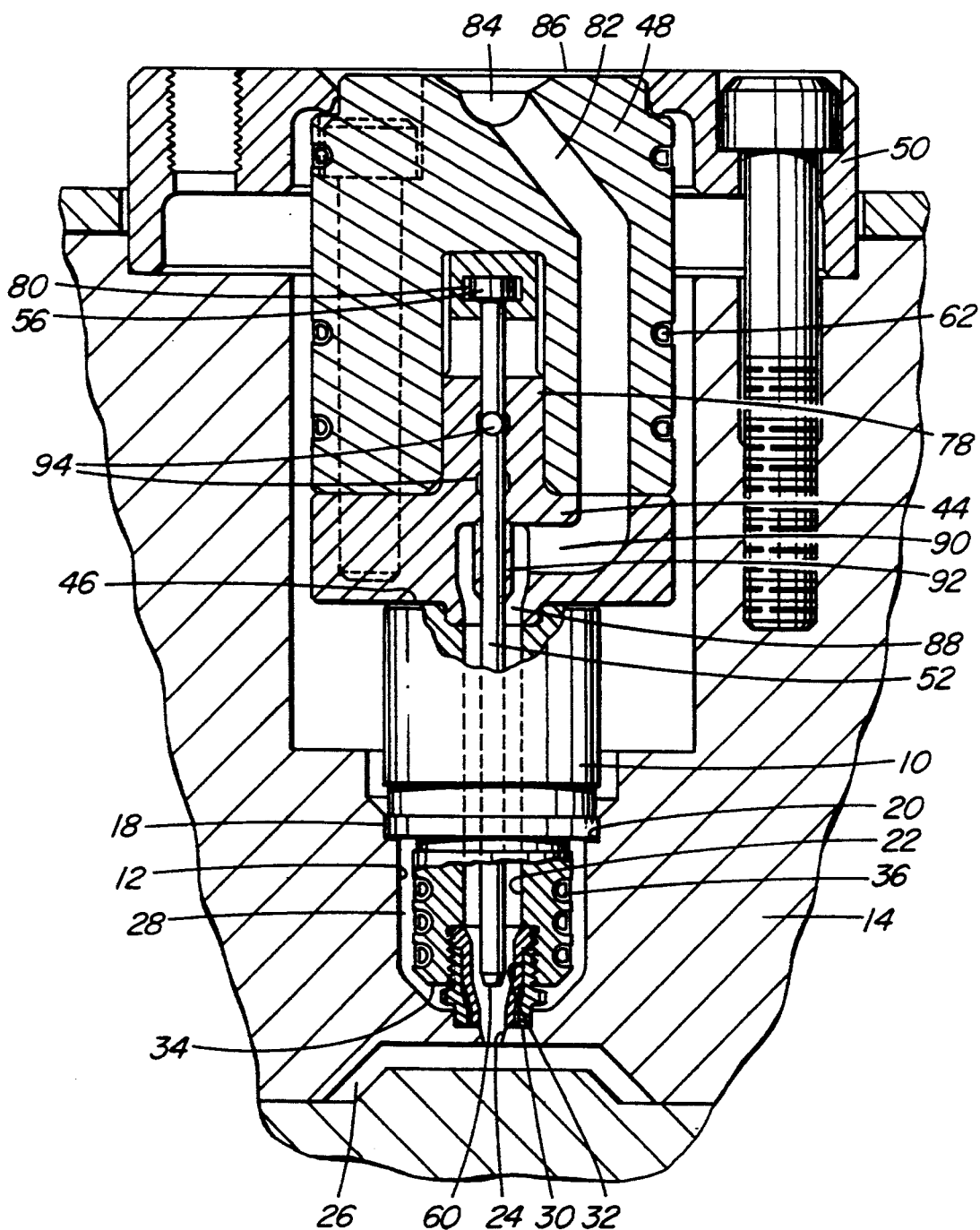
FIG. 2 is a larger sectional view of a portion of the apparatus seen in FIG. 1 taken at 90° to the sectional view seen in FIG. 1.

Reference is first made to FIGS. 1 and 2 which show single-cavity apparatus with a nozzle 10 seated in a well 12 in a cavity plate 14. While the mold 16 usually has a greater number of plates depending upon the application, in this case only a cavity plate 14 is shown for ease of illustration. The nozzle 10 has a circular locating flange 18 which sits on a circular shoulder 20 in the well 12 to accurately locate the nozzle 10 with its central bore 22 in alignment with the gate 24 extending through the cavity plate 14 to a cavity 26. This also provides an insulative air space 28 between the nozzle 10 and the surrounding cavity plate 14. In this configuration, a removable two-piece nozzle seal 30 is screwed into a threaded seat 32 in the front end 34 of the nozzle 10 to bridge the insulative air space 28 around the gate 24. The nozzle 10 is heated by an integral electrical heating element 36 which has an external terminal 38 and extends around the central bore 22. The operating temperature of the nozzle 10 near the gate 24 is monitored by a thermocouple element 40 which extends into the front end 34 of the nozzle 10. The cavity plate 14 is cooled by pumping cooling water through cooling conduits 42.

A steel sealing bushing 44 which will be described in more detail below is mounted between the rear end 46 of the nozzle 10 and a steel manifold 48 which is secured in place by a locating ring 50. An elongated valve member 52 extends through a valve member bore 54 in the sealing bushing 44 into the central bore 22 of the nozzle 10 in alignment with the gate 24. The elongated valve member 52 has an enlarged head 56 at its rear end 58 and a tapered front end 60 which seats in the gate 24 in the forward closed position. The manifold 48 is also heated by an integral electrical heating element 62 extending from an external terminal 64.

As described in the applicant's U.S. Pat. No. 4,919,606 which issued Apr. 24, 1990, the elongated valve member 52 is reciprocated between a forward closed position and a rearward open position by a rack and pinion actuating mechanism. A double-acting pneumatic cylinder 66 pivots a pinion member 68 which has teeth 70 engaging teeth 72 on a rack member 74. The rack member 74 and a rearwardly projecting portion 76 of the sealing bushing 44 are received in a slot 78 in the manifold 48 in which the rack member 74 is driven longitudinally by the pinion member 68. The head 56 of the valve member 52 is received in a T-slot 80 in the rack member 74 so that it moves longitudinally with the rack member 74.

A melt passage 82 extends from a central inlet 84 at the rear end 86 of the heated manifold 48 to convey melt through the sealing bushing 44 and the heated nozzle 10 to the gate 24. As seen in FIG. 2, in this single-cavity configuration, the melt passage 82 extends outwardly around the slot 78 in the manifold 48 in which the rack member 74 slides. The melt passage 82 has a longitudinal portion 88 which extends forwardly around the valve member 52 from the sealing bushing 44 through the central bore 22 in the nozzle 10 and a radial portion 90 which extends inwardly to join the longitudinal portion 88 in the sealing bushing 44. The elongated valve member 52 extends into the melt passage 82 in the sealing bushing 44 and in order to avoid a problem of the pressurized melt leaking rearwardly along the reciprocating valve member 52, the sealing bushing 44 has a collar portion 92 which extends forwardly into the melt passage 82 around the valve member 52. The collar portion 92 of the sealing bushing 44 fits around the valve member 52 to form a seal against substantial leakage of melt rearwardly along the reciprocating valve member 52. The sealing bushing 44 does have circumferential grooves 94 which extend around the valve member 52 and are vented to atmosphere through a vent duct 96 to relieve any build up of seepage and provide for the escape of any corrosive gases which are generated by the decomposition of any melt which is trapped around the valve member 52 and subjected to shearing action by the reciprocal movement of the valve member 52. In this embodiment, the collar portion 92 of the steel sealing bushing 44 is sufficiently thin that as the pressure of the melt surrounding it in the melt passage 82 is increased during injection, it is slightly compressed around the valve member 52 to improve the seal against melt leakage. Also, the length of the valve member bore 54 through the sealing bushing 44 is extended by the distance the thin collar portion 92 extends forwardly into the melt passage 82 which also improves the seal around the reciprocating valve member 52.

In use, the system is assembled as shown and electrical power is applied to the terminals 38, 64 of the heating elements 36, 62 to heat the nozzle 10 and the manifold 48 to a predetermined operating temperature. Pressurized melt from a molding machine (not shown) is introduced into the melt passage 82 through the central inlet 84 according to a predetermined cycle and controlled pneumatic pressure is applied to operate the cylinder 66 according to a matching cycle. When the cylinder 66 pivots the pinion member 68 to the open position shown in FIG. 1, the rack member 74 and the valve member 52 slide rearwardly to withdraw the front end 60 from the gate 24. The pressurized melt flows from the melt passage 82 through the gate 24 and fills the cavity 26. After the cavity 26 is filled, injection pressure is held long enough to pack the molded part and then released. The cylinder 66 then pivots the pinion member 68 to the closed position which causes the rack member 74 and the valve member 52 to slide forwardly until the front end 60 is seated in the matching gate 24. After a short cooling period, the mold is opened along the parting line 98 to eject the molded product. After ejection, the mold is closed, pneumatic pressure is applied to the cylinder 66 to withdraw the valve member 52 to the open position, and injection pressure is reapplied to refill the cavity 26. This cycle is repeated continuously with a frequency dependent upon the size of cavity and type of material being molded. Having the thin collar portion 92 of the sealing collar 44 extend forwardly adds to the length of the valve member bore 54 through the sealing bushing 44 without adding to the height of the mold 16. Also, it allows the pressure of the melt surrounding the collar portion 92 to be utilized to improve the seal around the valve member 52.

Figure 3:
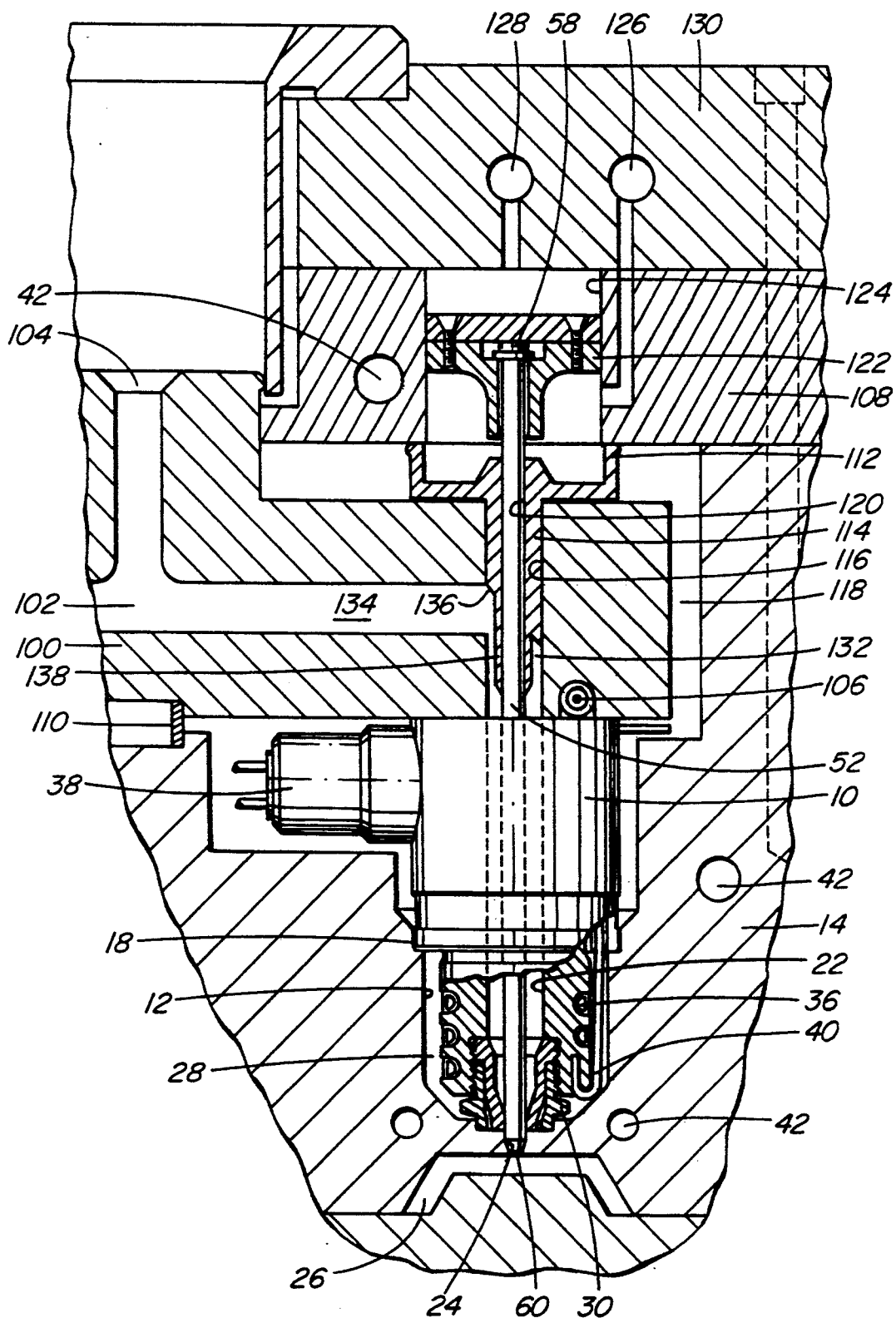
FIG. 3 is a partial sectional view of a portion of a multi-cavity injection molding apparatus according to another embodiment of the invention.

Reference is now made to FIG. 3 to describe another embodiment of the invention. As many of the elements are the same as those described above, elements common to both embodiments are described and illustrated using the same reference numerals. In this multi-cavity apparatus, a steel melt distribution manifold 100 bridges the rear ends 46 of a number of nozzles 10 and the melt passage 102 extending from a central inlet 104 branches in the manifold 100 to convey melt through each nozzle 10 to the respective gates 24. The melt distribution manifold 100 is heated by an integral electrical heating element 106. It is mounted between the cavity plate 14 and a cylinder plate 108 by a central locating ring 110 and by the flange portion 112 of a sealing bushing 114 seated in an opening 116 through the manifold 100 in alignment with each of the nozzles 10. Thus, an insulative air space 118 is provided between the heated manifold 100 and the surrounding cooled cavity plate 14 and cylinder plate 108.

Each elongated valve member 52 extends through a valve member bore 120 through the sealing bushing 114 and its rear end 58 is connected to a piston 122 seated in a cylinder 124 in the cylinder plate 108. Controlled air pressure is applied to opposite sides of the piston 122 through air ducts 126, 128 extending through a back plate 130 to reciprocate the valve member 52 between a retracted open position and the forward closed position shown in which its front end 60 is seated in the gate 24. While a pneumatic actuating mechanism is shown for ease of illustration, of course hydraulic actuating mechanisms are used for many applications.

Each sealing bushing 114 fits tightly in the opening 116 through the manifold 100. The melt passage 102 has a longitudinal portion 132 extending forwardly around the valve member 52 from each branch portion 134 extending in the distribution manifold 100. The sealing bushing 114 has an angled face 136 from which a thin collar portion 138 extends forwardly into the melt passage 102 around the valve member 52. As described above, the thin collar portion 138 fits around the valve member 52 to provide a seal against leakage of melt rearwardly along the valve member 52 as it reciprocates. This seal is improved by the length of the valve member bore 120 being extended by the distance the collar portion 138 extends forwardly into the melt passage 102. The collar portion 138 is sufficiently thin that injection pressure of the melt surrounding it in the melt passage 102 compresses it slightly around the valve member 52 to improve the seal against melt leakage around the reciprocating valve member 52. For some applications, it is not necessary that the collar portion 138 be thin enough to be compressible around the valve member 52, but it must be thin enough not to unduly impede melt flow around it in the melt passage 102. As mentioned above, in this embodiment the sealing bushing 114 has a circular flange portion 112 which extends rearwardly to abut against the cylinder plate 108, but in other arrangements this is not required. For instance, the sealing bushing 114 can be retained in the opening 116 in the manifold 100 by a shoulder or other suitable means. In another alternative, the sealing bushing can be a larger diameter plug seated in the manifold which forms the portion of the melt passage into which the thin collar portion 138 extends. The injection cycle of this embodiment of the invention is similar to that described above and its description need not be repeated.

While the description of the injection molding apparatus according to the invention has been give with respect to preferred embodiments, it will be evident that various other modifications are possible without departing from the scope of the invention as understood by those skilled in the art and as defined in the following claims.

The embodiments of the invention in which an exclusive property or privilege is claimed are defined as follows:

1. In a valve gated injection molding apparatus having at least one heated nozzle seated in a mold, the heated nozzle having a rear end and a central bore extending therethrough in alignment with a gate in the mold leading to a cavity, a melt passage extending through a manifold and the central bore in the heated nozzle to convey melt to the gate, an elongated valve member having a front end and a rear end extending through the central bore of the nozzle, the rear end of the valve member being driven to reciprocate the valve member between a retracted open position and a forward closed position in which the front end of the valve member is seated in the gate, and a valve member sealing bushing being mounted rearwardly of the heated nozzle and having a valve member bore extending therethrough in alignment with the central bore of the nozzle whereby the elongated valve member extends through the valve member bore in the sealing bushing into the melt passage in alignment with the gate, the improvement wherein;

the valve member sealing bushing has a thin collar portion which extends a predetermined distance forwardly into the melt passage in the manifold and fits around the valve member, the collar portion of the sealing bushing being sufficiently thin whereby injection pressure of the surrounding melt in the melt passage in the manifold compresses the collar portion of the sealing bushing around the valve member to form a seal against substantial leakage of melt rearwardly along the reciprocating valve member.

2. Injection molding apparatus as claimed in claim 1 wherein the sealing bushing is made of steel.

3. Injection molding apparatus as claimed in claim 2 for single-cavity molding wherein the sealing bushing is mounted between the rear end of the nozzle and the manifold, and the collar portion of the sealing bushing extends forwardly into a portion of the melt passage extending through the sealing bushing.

4. Injection molding apparatus as claimed in claim 2 for multi-cavity molding wherein the manifold is a melt distribution manifold mounted adjacent the rear ends of a plurality of spaced nozzles, the melt passage branching outwardly in the melt distribution manifold to convey melt from a common inlet through the central bore in each nozzle to the respective gates, the manifold having an opening extending therethrough in alignment with each nozzle, the sealing bushing being seated in the opening in the manifold with the thin collar portion extending forwardly into the melt passage.

5. Injection molding apparatus as claimed in claim 4 wherein each opening through the manifold has a rear portion and a front portion, the sealing bushing being seated in the rear portion of the opening and the front portion of the opening forming a portion of the melt passage into which the thin collar portion of the sealing bushing extends.

* * * * *